(12) United States Patent
Wang et al.

(10) Patent No.: US 10,959,232 B2
(45) Date of Patent: Mar. 23, 2021

(54) PHYSICAL UPLINK CONTROL CHANNEL RELIABILITY ENHANCEMENTS

(71) Applicant: QUALCOMM Incorporated, San Diego, CA (US)

(72) Inventors: Xiao Feng Wang, San Diego, CA (US); Tao Luo, San Diego, CA (US); Sony Akkarakaran, Poway, CA (US); Makesh Pravin John Wilson, San Diego, CA (US); Yan Zhou, San Diego, CA (US); Wooseok Nam, San Diego, CA (US); Abhishek Sinha, Kolkata (IN); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 87 days.

(21) Appl. No.: 16/378,099

(22) Filed: Apr. 8, 2019

(65) Prior Publication Data

US 2019/0313393 A1 Oct. 10, 2019

Related U.S. Application Data

(60) Provisional application No. 62/655,606, filed on Apr. 10, 2018.

(51) Int. Cl.
*H04W 72/02* (2009.01)
*H04W 72/04* (2009.01)
(Continued)

(52) U.S. Cl.
CPC ........ *H04W 72/046* (2013.01); *H04B 17/309* (2015.01); *H04W 72/02* (2013.01); *H04W 88/02* (2013.01)

(58) Field of Classification Search
CPC ... H04W 72/02; H04W 72/046; H04W 88/02; H04B 17/309
See application file for complete search history.

(56) References Cited

U.S. PATENT DOCUMENTS

2013/0217404 A1* 8/2013 Jung .................... H04W 48/20
455/452.1

OTHER PUBLICATIONS

Huawei et al., "Remaining issue for Beam Management", 3GPP Draft; R1-1803636, 3rd Generation Partnership Project (3GPP), Mobile Competence Centre ; 650, Route Des Lucioles ; F-06921 Sophia-Antipolis Cedex ; France, vol. RAN WG1, No. Sanya, China; Apr. 16, 2018-Apr. 20, 2018, Apr. 6, 2018 (Apr. 6, 2018), XP051412934, 7 Pages, Retrieved from the Internet: URL:http://www.3gpp.org/ftp/tsg%5Fran/WG1%5FRL1/TSGR1%5F92b/Docs/ [retrieved on Apr. 6, 2018], Section 2.3.

(Continued)

*Primary Examiner* — Brian P Cox
(74) *Attorney, Agent, or Firm* — Holland & Hart LLP

(57) ABSTRACT

Methods, systems, and devices for wireless communications are described. A user equipment (UE) may receive a signal identifying a first beam configuration and a second beam configuration to be used for performing a beamformed transmission of a physical uplink control channel (PUCCH) signal. The UE may determine, for a first PUCCH transmission occasion associated with the first beam configuration, that a communication metric associated with performing the beamformed transmission of the PUCCH signal using the first beam configuration fails to satisfy a threshold. The UE may perform, at a second PUCCH transmission occasion and based at least in part on the determining, the beamformed transmission of the PUCCH signal according to the second beam configuration.

30 Claims, 11 Drawing Sheets

(51) Int. Cl.
H04B 17/309 (2015.01)
H04W 88/02 (2009.01)

(56) References Cited

OTHER PUBLICATIONS

International Search Report and Written Opinion—PCT/US2019/026625—ISA/EPO—dated Jun. 26, 2019.
Mediatek Inc: "MAC CEs for Beam Management and CSI Acquisition", 3GPP Draft; R2-1802405 MAC CES for Beam Management and CSI Acquisition, 3rd Generation Partnership Project (3GPP), Mobile Competence Centre ; 650, Route Des Lucioles ; F-06921 Sophia-Antipolis Cedex; vol. RAN WG2, No. Athens, Greece; Feb. 26, 2018-Mar. 2, 2018, Feb. 16, 2018 (Feb. 16, 2018), XP051400142, 10 Pages, Retrieved from the Internet: URL:http://www.3gpp.org/ftp/tsg%5Fran/WG2%5FRL2/TSGR2%5F101/Docs/ [retrieved on Feb. 16, 2018], Section 4.2.
ZTE et al., "Details of UL Beam Management", 3GPP Draft; R1-1721373 UL Beam Management, 3rd Generation Partnership Project (3GPP), Mobile Competence Centre; 650, Route Des Lucioles; F-06921 Sophia-Antipolis Cedex ; France, vol. RAN WG1, No. Reno, USA; Nov. 27, 2017-Dec. 1, 2017, Nov. 27, 2017 (Nov. 27, 2017), XP051363829, 6 Pages, Retrieved from the Internet: URL:http://www.3gpp.org/ftp/Meetings%5F3GPP%5FSYNC/RAN1/Docs/ [retrieved on Nov. 27, 2017], Section 3.2.

* cited by examiner

PHYSICAL UPLINK CONTROL CHANNEL RELIABILITY ENHANCEMENTS

CROSS REFERENCE

The present application for patent claims the benefit of U.S. Provisional Patent Application No. 62/655,606 by WANG et al., entitled "PHYSICAL UPLINK CONTROL CHANNEL RELIABILITY ENHANCEMENTS IN MILLIMETER WAVE," filed Apr. 10, 2018, assigned to the assignee hereof, and expressly incorporated herein.

BACKGROUND

The following relates generally to wireless communications, and more specifically to physical uplink control channel (PUCCH) reliability enhancements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some aspects, wireless communication systems may utilize PUCCH transmissions for a variety of reasons. The PUCCH transmissions may be uplink transmissions from a UE to a base station. In a mmW network, the PUCCH transmissions may be used to support beam management functionality. As one example, a UE may rely on the reliability of the PUCCH signals to carry or otherwise convey an indication of periodic channel performance feedback reporting, e.g., channel state information (CSI) reporting. As another example, the PUCCH signals may carry or otherwise convey an indication of acknowledgement/negative-acknowledgement (ACK/NACK) feedback for physical uplink shared channel (PUSCH), which may also carry a beam-control related medium access control (MAC) control element (CE). However, in some situations the beam used to transmit the PUCCH signal may suddenly degrade to a point that the beam (e.g., the beam configuration) no longer supports PUCCH transmissions reliably. In some aspects, the sudden loss of the beam used for PUCCH transmissions may result in a beam management failure condition occurring.

SUMMARY

The described techniques relate to improved methods, systems, devices, and apparatuses that support physical uplink control channel (PUCCH) reliability enhancements in mmW. Generally, the described techniques provide a mechanism where a user equipment (UE) autonomously chooses a beam configuration to use for a PUCCH transmission. For example, the UE may receive a signal configuring multiple beam configurations for the UE. In some aspects, the multiple beam configurations may include two or more quasi-colocation (QCL) configurations that the UE can choose from to select a beam for the PUCCH transmission. The UE may, when the first PUCCH transmission is scheduled, determine that a performance level (e.g., a communication metric) of a first beam configuration fails to satisfy a threshold. For example, the reference signal receive power (RSRP) level for the first beam configuration may fall below a threshold. In another example, the UE may determine that an available transmit power level for transmitting using the first beam configuration may be below a threshold level. Accordingly, the UE may select a second configured beam configuration to use to perform the PUCCH transmission. In some aspects, the UE may perform the PUCCH transmission using the second beam configuration after a certain time offset, e.g., after an absolute or time delay from the time the PUCCH transmission using the first beam configuration was meant to occur. In another example, the time offset may be a certain number of slots configured for uplink communications that occur after a certain offset. Accordingly, the UE may autonomously determine which beam configuration (e.g., QCL) to use for the PUCCH transmission.

A method of wireless communication at a UE is described. The method may include receiving a signal identifying a first beam configuration and a second beam configuration to be used for performing a beamformed transmission of a PUCCH signal, determining, for a first PUCCH transmission occasion associated with the first beam configuration, that a communication metric associated with performing the beamformed transmission of the PUCCH signal using the first beam configuration fails to satisfy a threshold, and performing, at a second PUCCH transmission occasion and based on the determining, the beamformed transmission of the PUCCH signal according to the second beam configuration.

An apparatus for wireless communication at a UE is described. The apparatus may include a processor, memory coupled with the processor, and instructions stored in the memory. The instructions may be executable by the processor to cause the apparatus to receive a signal identifying a first beam configuration and a second beam configuration to be used for performing a beamformed transmission of a PUCCH signal, determine, at a first PUCCH transmission occasion associated with the first beam configuration, that a communication metric associated with performing the beamformed transmission of the PUCCH signal using the first beam configuration fails to satisfy a threshold, and perform, at a second PUCCH transmission occasion and based on the determining, the beamformed transmission of the PUCCH signal according to the second beam configuration.

Another apparatus for wireless communication at a UE is described. The apparatus may receive a signal identifying a first beam configuration and a second beam configuration to be used for performing a beamformed transmission of a PUCCH signal, determine, for a first PUCCH transmission occasion associated with the first beam configuration, that a communication metric associated with performing the beamformed transmission of the PUCCH signal using the first beam configuration fails to satisfy a threshold, and perform, at a second PUCCH transmission occasion and based on the determining, the beamformed transmission of the PUCCH signal according to the second beam configuration.

A non-transitory computer-readable medium storing code for wireless communication at a UE is described. The code may include instructions executable by a processor to receive a signal identifying a first beam configuration and a second beam configuration to be used for performing a beamformed transmission of a PUCCH signal, determine, for a first PUCCH transmission occasion associated with the first beam configuration, that a communication metric associated with performing the beamformed transmission of the PUCCH signal using the first beam configuration fails to satisfy a threshold, and perform, at a second PUCCH transmission occasion and based on the determining, the beamformed transmission of the PUCCH signal according to the second beam configuration.

Some examples of the method, apparatuses, and non-transitory computer-readable medium described herein may further include operations, features, means, or instructions for determining that the communication metric associated with the second beam configuration satisfies the threshold and selecting the second beam configuration to use to perform the beamformed transmission of the PUCCH signal based on the determining.

Some examples of the method, apparatuses, and non-transitory computer-readable medium described herein may further include operations, features, means, or instructions for identifying, based on the signal, a time-offset value associated with a time difference between the first PUCCH transmission occasion and the second PUCCH transmission occasion.

In some examples of the method, apparatuses, and non-transitory computer-readable medium described herein, the time-offset value includes at least one of a zero value, or a positive integer value, or an absolute time, or a relative time.

Some examples of the method, apparatuses, and non-transitory computer-readable medium described herein may further include operations, features, means, or instructions for identifying a first available PUCCH transmission occasion that occurs after a time-offset value following the first PUCCH transmission occasion, where the second PUCCH transmission occasion may be based on the first available PUCCH transmission occasion.

Some examples of the method, apparatuses, and non-transitory computer-readable medium described herein may further include operations, features, means, or instructions for determining that a value for a channel performance parameter associated with using the first beam configuration does not satisfy the threshold, where the communication metric may be based on the channel performance parameter.

In some examples of the method, apparatuses, and non-transitory computer-readable medium described herein, the value for the channel performance parameter includes at least one of a RSRP value, or a reference signal receive quality (RSRQ) value, or a signal-to-noise ratio (SNR), or a signal-to-noise-plus-interference (SINR), or a throughput rate for the channel, or a combination thereof.

Some examples of the method, apparatuses, and non-transitory computer-readable medium described herein may further include operations, features, means, or instructions for determining, based on a maximum permissible exposure (MPE) limit, that an available transmit power level may be below a value associated with the threshold value, where the communication metric may be based on the determining.

Some examples of the method, apparatuses, and non-transitory computer-readable medium described herein may further include operations, features, means, or instructions for receiving the signal configuring a set of available PUCCH resources, where the set of available PUCCH resources include at least the first beam configuration and the second beam configuration.

In some examples of the method, apparatuses, and non-transitory computer-readable medium described herein, the second beam configuration includes a frequency resource that may be different from a frequency resource of the first beam configuration.

In some examples of the method, apparatuses, and non-transitory computer-readable medium described herein, the first beam configuration includes a first QCL configuration that may be different from a second QCL configuration of the second beam configuration.

In some examples of the method, apparatuses, and non-transitory computer-readable medium described herein, the signal may be received in at least one of a downlink control indicator (DCI) signal, or a configuration signal, or a combination thereof.

DETAILED DESCRIPTION

Figure 1:
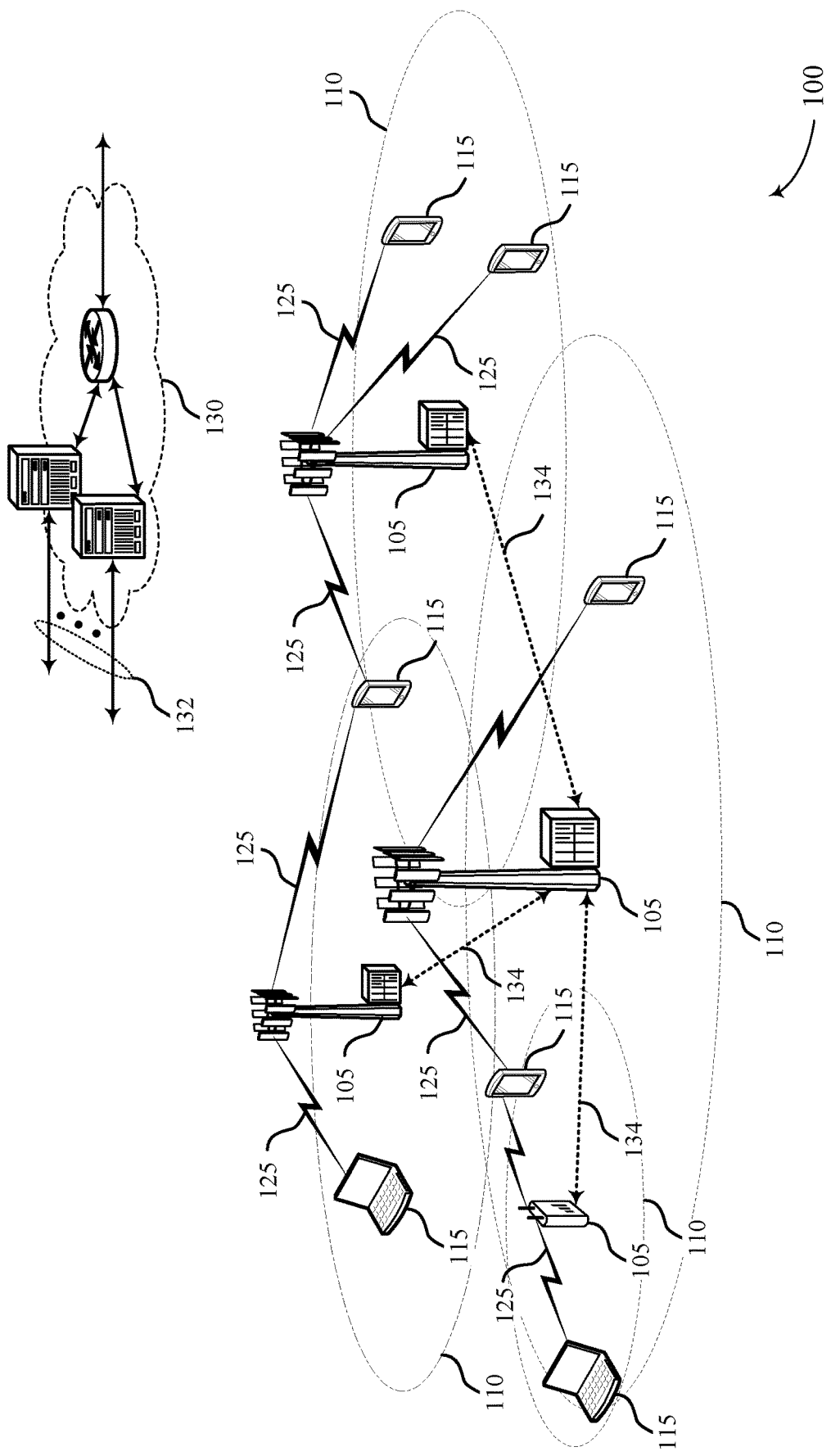
FIG. 1 illustrates an example of a wireless communications system that supports physical uplink control channel (PUCCH) reliability enhancements in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

Some wireless communication systems, such as in a mmW network, support beam management functionality to maintain a current transmit beam at the base station and/or user equipment (UE), e.g., a transmit beam and/or receive beam at either device. The beam management procedure typically includes the UE transmitting channel state information (CSI) signals to the base station in a physical uplink control channel (PUCCH) signal. The PUCCH signal also contains other information necessary for the continued operation of the wireless network. Typically, the network configures the resources for the UE to use for the PUCCH signal transmission, e.g., the time resources, frequency resources, beam configuration, and the like. When the UE selects a configured resource for the PUCCH transmission, the UE typically selects the resource based on the size of the uplink control information (UCI) that will be communicated in the PUCCH signal. However, the performance of the beam to be used for the PUCCH transmission may suddenly degrade below an acceptable threshold to support the PUCCH transmission. For example, the propagation path of the beam may suddenly become blocked, may experience fading, and the like. However, conventional techniques do not support the UE selecting a different beam to use for the PUCCH transmission. Accordingly, the PUCCH signal transmission may be unsuccessful, which may result in failed communications and a link loss between the UE and the base station.

Aspects of the disclosure are initially described in the context of a wireless communications system. Aspects of the present disclosure provide for an effective mechanism that supports the UE autonomously determining which beam configuration (e.g., which quasi-colocation (QCL) configuration) to use for a PUCCH signal transmission. The UE may be configured with multiple (e.g., two or more) beam configurations. A first beam configuration may be referred to as a primary beam configuration that the UE is to use for a PUCCH signal transmission at a first PUCCH transmission occasion. A second beam configuration may be referred to as a secondary or supplemental beam configuration that the UE is to use for the PUCCH signal transmission at a second PUCCH transmission occasion. In some aspects, a time offset value may be the difference between the first PUCCH transmission occasion and the second PUCCH transmission occasion. At the first PUCCH transmission occasion, the UE may determine that the performance level (e.g., the communication metric) of the first beam configuration has fallen below an acceptable threshold level. Accordingly, the UE may select the second beam configuration to use to perform the PUCCH signal transmission at the second PUCCH transmission occasion. Thus, aspects of the described techniques support the UE having flexibility and autonomy in selecting the beam configuration for the PUCCH signal transmission to improve reliability.

Aspects of the disclosure are further illustrated by and described with reference to apparatus diagrams, system diagrams, and flowcharts that relate to PUCCH reliability enhancements in mmW.

FIG. 1 illustrates an example of a wireless communications system 100 that supports PUCCH reliability enhancements in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internetof-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive a signal identifying a first beam configuration and a second beam configuration to be used for performing a beamformed transmission of a PUCCH signal. The UE 115 may determine, at a first PUCCH transmission occasion associated with the first beam configuration, that a communication metric associated with performing the beamformed transmission of the PUCCH signal using the first beam configuration fails to satisfy a threshold. The UE 115 may perform, at a second PUCCH transmission occasion and based at least in part on the determining, the beamformed transmission of the PUCCH signal according to the second beam configuration.

Figure 2:
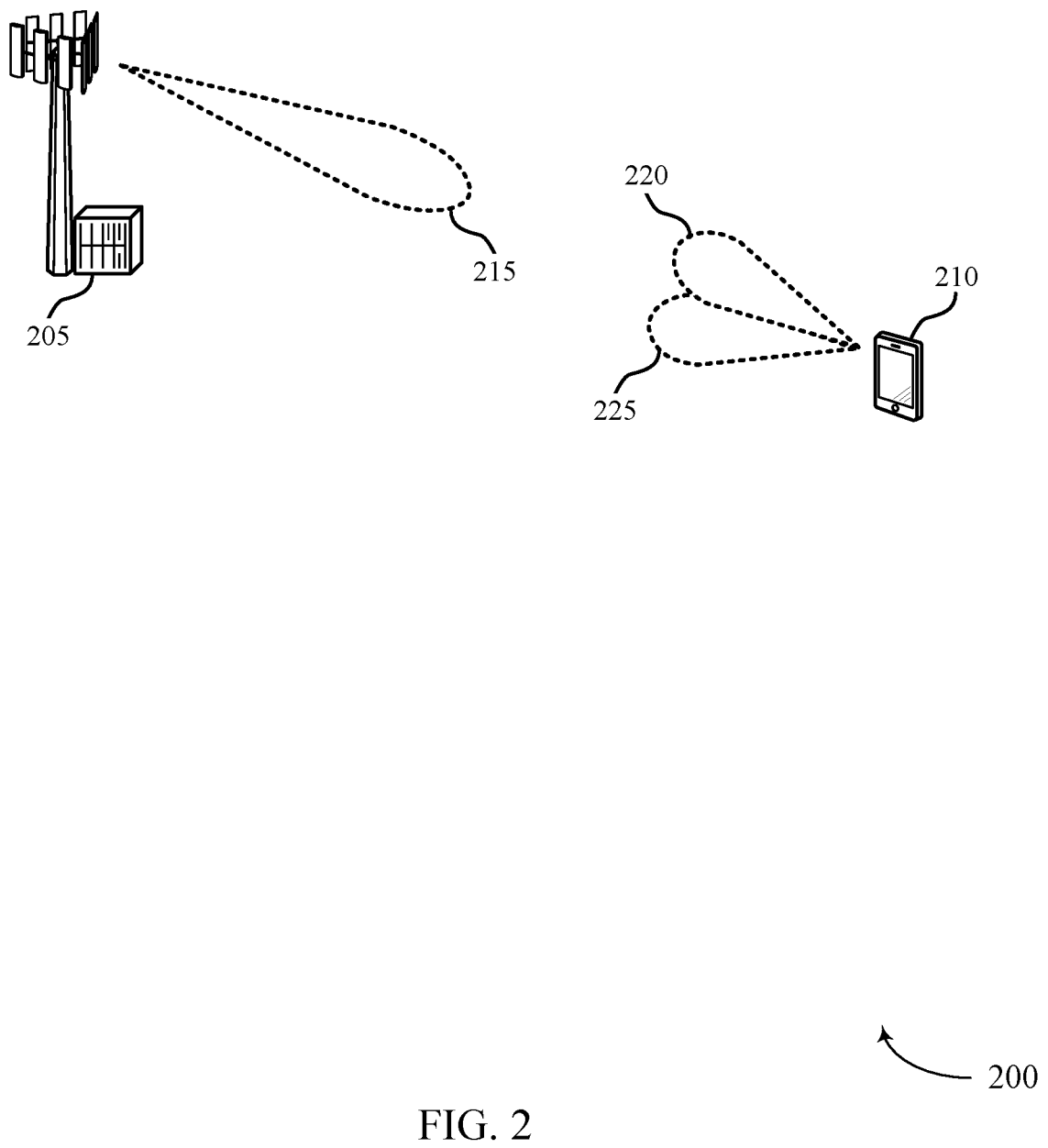
FIG. 2 illustrates an example of a wireless communication system that supports PUCCH reliability enhancements in accordance with aspects of the present disclosure.

FIG. 2 illustrates an example of a wireless communication system 200 that supports PUCCH reliability enhancements in accordance with aspects of the present disclosure. In some examples, wireless communication system 200 may implement aspects of wireless communication system 100. In some aspects, wireless communication system 200 may include a base station 205 and a UE 210, which may be examples of the corresponding devices described herein.

In some aspects, wireless communication system 200 may be a mmW network. For example, base station 205 may perform beamformed transmissions to UE 210 using beam 215 and UE 210 may perform beamformed transmissions to base station 205 using one of beams 220 or 225. Generally, a beam may refer to a beamformed signal having an associated beam configuration. The beam configuration may refer to a certain characteristic of the beam, such as beam direction, beam width, beam shape, QCL feature, and the like. The beam may refer to a transmit beam and/or a receive beam, or a beam association.

In some aspects, base station 205 and UE 210 may perform beam management functions in order to maintain an active beam. The beam management functions may include base station 205 configuring UE 210 to transmit periodic CSI information, such as RSRP, RSRQ, CQI, error rate information, throughput level indications, and the like. The network uses the CSI information to configure resources for the UE 210, which may include assigning time and/or frequency resources, beam configurations, and the like. The UE 210 periodically transmits the CSI reports to base station 205 in a PUCCH signal, e.g., as often as is configured by the base station. PUCCH transmissions can also be triggered by base station 205 using a DCI signal. The PUCCH transmissions can also carry other valuable information, such as ACK/NACK information for PUSCH signals.

When scheduling resources for the PUCCH transmissions, base station 205 typically schedules UE 210 with multiple PUCCH resource sets, with each PUCCH resource set being associated with a particular UCI size. For each PUCCH resource set, base station 205 may schedule multiple PUCCH resources, with each PUCCH resource having a configured time resource, frequency resources, and one QCL (e.g., spatial relation information) indicating the beam to be used for the PUCCH transmission. When the PUCCH transmission is DCI triggered, the PUCCH resource for UE 210 to use is indicated in the DCI. When the PUCCH transmission is for a periodic CSI reporting, the PUCCH resource for UE 210 to use is indicated in the configuration for the periodic CSI reporting. Accordingly, UE 210 must typically use the beam that base station 205 indicates for the PUCCH transmission.

However, in some situations the beam to be used for the PUCCH transmission may suddenly degrade to below an acceptable performance threshold. For example, the beam may degrade due to blocking or fading, an available transmit power for the beam may be below a threshold (e.g., due to MPE limitations, limited transmit power due to other high priority transmissions in another carrier or cell group), and the like. Moreover, these sudden changes in the communication metrics may not be known by the network (e.g., base station 205) and therefore, if UE 210 uses the configured beam for the PUCCH transmission, the PUCCH transmission may fail. A PUCCH transmission failure may mean that the beam management function, the ACK/NACK reporting function, and other critical network functions may fail.

Accordingly, aspects of the described techniques improve the reliability of the PUCCH transmission to improve performance. Generally, the described techniques provide a mechanism where UE 210 can autonomously choose the best beam to use for the PUCCH transmission in order to ensure high reliability of the PUCCH signal. Aspects of the described techniques may consider network complexity and efficiency, power efficiency at the UE 210, and the like. Generally, the described techniques provide for the network to configure, for a PUCCH resource, two (or more) beams for UE 210 to use for the beamformed transmission of the PUCCH signal. The two (or more) beams may refer to the beam configuration, e.g., the QCL feature, of the beam for UE 210 to use. One of the configured QCL (e.g., a first beam configuration) may be considered a primary beam (e.g., beam 220) and a second of the configured QCL may be considered a secondary or supplemental beam (e.g., beam 225).

When UE 210 is configured for a beamformed transmission of the PUCCH signal (e.g., at a first PUCCH transmission occasion), UE 210 may determine if there is a potential problem with performing the PUCCH transmission using the first beam configuration (e.g., beam 220). For example, UE 210 may determine whether a communication metric associated with using the first beam configuration has fallen below a threshold level. In some examples, this may include UE 210 determining that the RSRP, RSRQ, a SNR, a SINR, a throughput level, an error rate, and the like (e.g., a channel performance parameter), for the first beam configuration has fallen below an acceptable threshold level. In some examples, this may include UE 210 determining that an available transmit power for the beamformed transmission of the PUCCH signal has fallen below an acceptable threshold level. This may be based on a MPE limit for the UE, based on the UE 210 performing other high-priority transmissions on different carriers or cell groups, and the like. Accordingly, the available transmit power may be the remaining transmit power available after UE 210 transmits the other signals. In the situation where UE 210 determines that there is no potential problem (e.g., the first beam configuration satisfies the threshold) with performing the PUCCH transmission using the first beam configuration, UE 210 may select the first beam configuration to use to perform the beamformed transmission of the PUCCH signal. However, when there is a potential problem (e.g., the first beam configuration fails to satisfy the threshold), UE 210 may select the second beam configuration (e.g., beam 225) to use to perform the beamformed transmission of the PUCCH signal.

In some aspects, UE 210 may determine the performance (e.g., communication metric) of both the first beam configuration (e.g., beam 220) and the second beam configuration (e.g., beam 225) and select from the best performing beam configuration. For example, at the first PUCCH transmission occasion the UE 210 may determine the communication metric of the first and second beam configuration to determine which beam satisfies an acceptable threshold level, e.g., which beam configuration can provide the best performance for the beamformed transmission of the PUCCH signal. In the situation where neither beam configuration satisfies the threshold level, UE 210 may identify which beam configuration will perform best for the PUCCH transmission. Accordingly, UE 210 may choose between the better of the two beam configurations to use for the beamformed transmission of the PUCCH signal.

In some aspects, UE 210 may select the second beam configuration to use for the beamformed transmission of the PUCCH signal at a second PUCCH transmission occasion. The second PUCCH transmission occasion may occur a time offset after the first PUCCH transmission occasion. In some aspects, the time offset can be configured by the network. In some aspects, the time offset may be configured as zero (0) such that UE 210 simply chooses the best performing beam configuration and uses it to transmit the PUCCH signal. In some aspects, the time offset may be configured as an absolute time offset, e.g., a fixed time that UE 210 waits after the first PUCCH transmission occasion before performing the PUCCH transmission using the second beam configuration. In some aspects, the time offset may be a relative time offset, e.g., a first uplink configured slot that occurs after the first PUCCH transmission occasion.

In some aspects, the first and second beam configurations may also have different associated frequency resources. For example, a PRB offset can be configured (e.g., as in the PUCCH resource configuration) to allow the second beam configuration (e.g., the supplemental beam) to use different frequency resources.

In some aspects, instead of two beam configurations (e.g., QCLs) for a PUCCH resource, the network may configure a supplementary PUCCH resource for one or multiple PUCCH resources. The supplementary PUCCH resource may be a frequency and/or time resource that is different from the primary resources. The QCL in the supplementary resource may differ from the QCL of any of its primary resource. The time offset may be defined for the supplementary resource.

Figure 3:
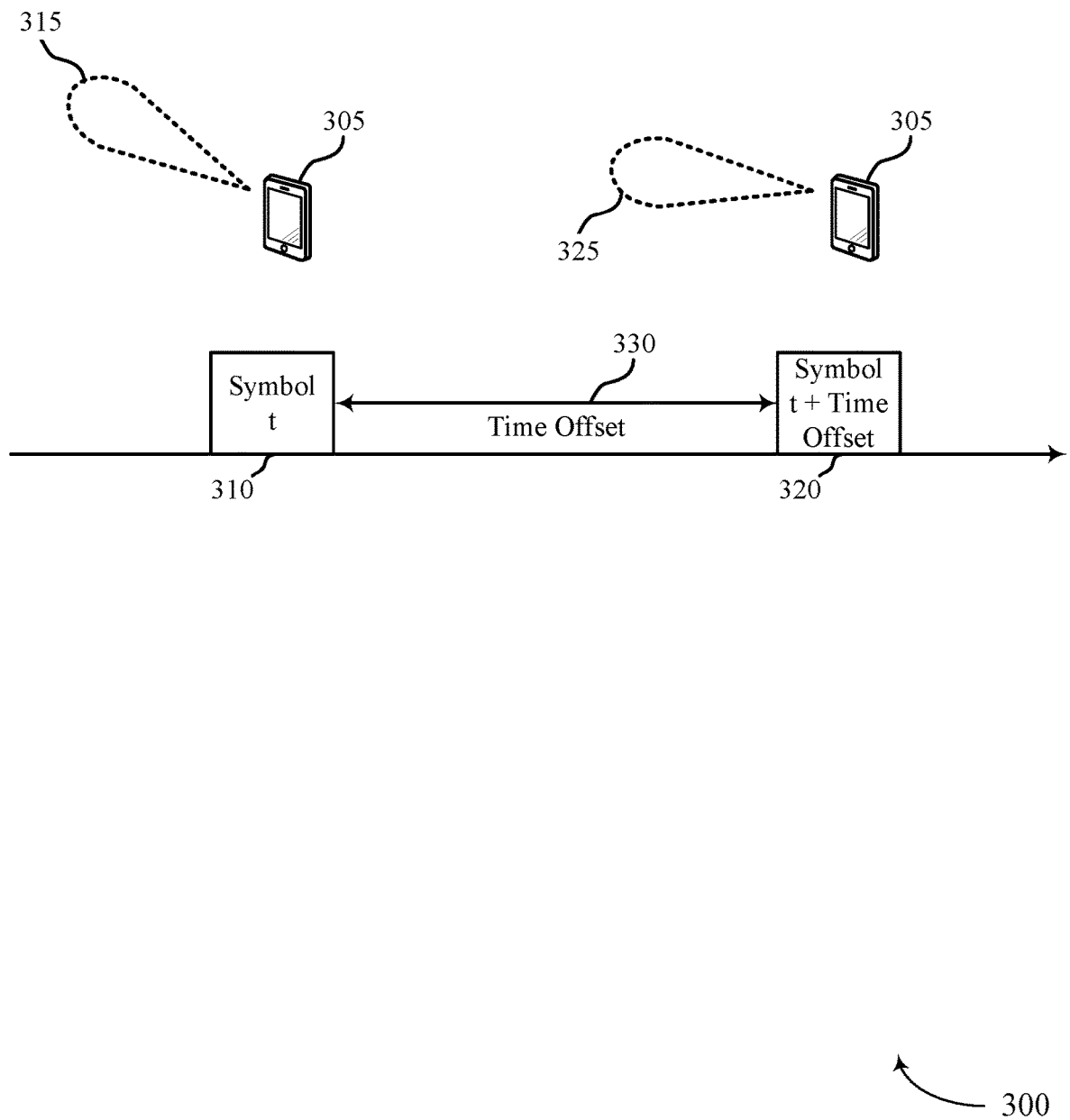
FIG. 3 illustrates an example of a timing diagram that supports PUCCH reliability enhancements in accordance with aspects of the present disclosure.

FIG. 3 illustrates an example of a timing diagram 300 that supports PUCCH reliability enhancements in accordance with aspects of the present disclosure. In some examples, timing diagram 300 may implement aspects of wireless communication systems 100/200. Aspects of timing diagram 300 may be implemented by a UE 305, which may be an example of the corresponding device described herein.

Generally, timing diagram 300 illustrates aspects of a time offset 330. UE 305 may be configured with a beam 315 (e.g., a first beam configuration) and with a beam 325 (e.g., a second beam configuration). The beams may be configured for a beamformed transmission of a PUCCH signal. At a first PUCCH transmission occasion 310 (which occurs at symbol t), UE 305 may determine that a communication metric associated with using the first beam configuration (e.g., beam 315) fails to satisfy a threshold level. For example, a channel performance parameter (e.g., RSRP, RSRQ, CQI, SNR, etc.), an available transmit power level, and the like, may have degraded to an unacceptable performance level. Accordingly, UE 305 may select the second beam configuration (e.g., beam 325) to use to perform the beamformed transmission of the PUCCH signal at a second PUCCH transmission occasion 320. The second PUCCH transmission occasion may occur at a symbol t plus a time offset 330).

Generally, the time offset 330 may refer to the time period between the first PUCCH transmission occasion 310 and the second PUCCH transmission occasion 320. Generally, the time offset 330 may refer to an absolute time or a relative time. The time offset 330 may refer to a positive integer. In some aspects, the time offset 330 may be configurable and can be zero (e.g., in the situation where the network is able to receive over the two beams simultaneously). In the example timing diagram 300, the time offset 330 is not configured as zero. In some aspects, the time offset 330 can be an element in a PUCCH resource configuration. For efficiency of resources, the network may configure the time offset 330 large enough so that upon successful decoding of the PUCCH over the primary beam (e.g., beam 315), the frequency-time resource associated with the supplementary beam (e.g., beam 325) can be scheduled for other purposes. In a TDD configuration, the transmit time of the supplementary beam may be the earliest time after symbol t plus the time offset 330 that is available for an uplink PUCCH transmission based on network configuration/signal, such as a slot format indicator (SFI).

Figure 4:
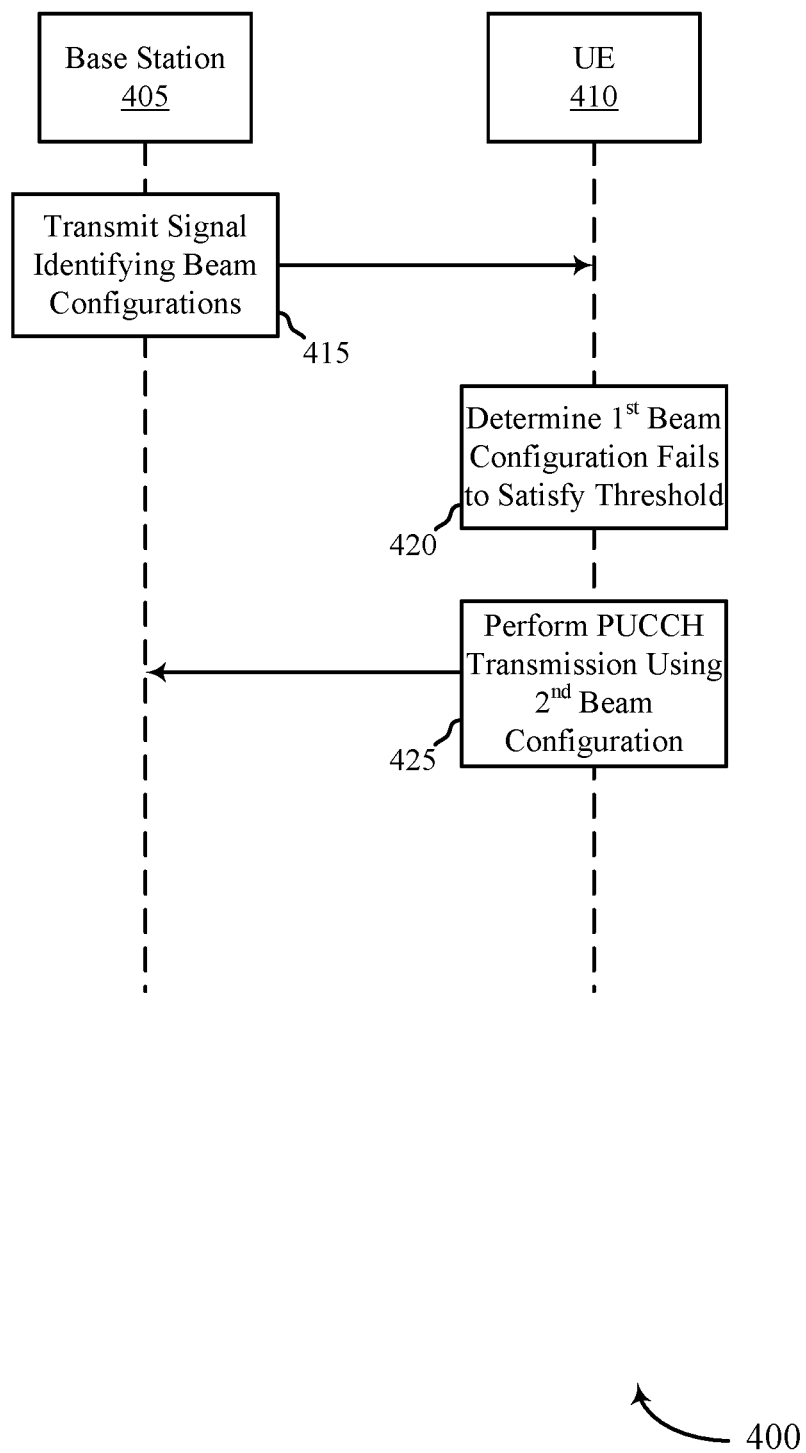
FIG. 4 illustrates an example of a process that supports PUCCH reliability enhancements in accordance with aspects of the present disclosure.

FIG. 4 illustrates an example of a process 400 that supports PUCCH reliability enhancements in accordance with aspects of the present disclosure. In some examples, process 400 may implement aspects of wireless communication systems 100/200 and/or timing diagram 300. Aspects of process 400 may be implemented by base station 405 and UE 410, which may be examples of the corresponding devices described herein.

At 415, base station 405 may transmit (and UE 410 may receive) a signal that identifies a first beam configuration and a second beam configuration that are to be used to perform a beamformed transmission of a PUCCH signal. In some aspects, this may include UE 410 receiving a signal that configures a plurality of available PUCCH resources, with the plurality of available PUCCH resources including at least the first beam configuration and the second beam configuration. In some aspects, the first beam configuration may have an associated frequency resource that is different from the second beam configuration. In some aspects, the first beam configuration may have an associated QCL configuration that is different from a QCL configuration associated with the second beam configuration. In some aspects, the signal may be received in a DCI signal and/or a configuration signal.

At 420, UE 410 may determine, at a first PUCCH transmission occasion that is associated with the first beam configuration, that a communication metric associated with performing the beamformed transmission of the PUCCH signal using the first beam configuration fails to satisfy a threshold. In some aspects, this may include UE 410 determining that a communication metric associated with a second beam configuration satisfies the threshold. UE 410 may then select the second beam configuration to use to perform the beamformed transmission of the PUCCH signal based on the determination that the second beam configuration satisfies the threshold.

In some aspects, this determining at 420 may include UE 410 determining that a channel performance parameter associated with using the first beam configuration does not satisfy a threshold value. The communication metric may be based on the channel performance parameter. Examples of the channel performance parameter may include, but are not limited to, a RSRP, a RSRQ, a SNR, a SINR, and/or a throughput rate. In some aspects, this may include UE 410 determining that an available transmit power level is below a threshold value. For example, UE 410 may be configured with an MPE limit, which may limit UE 410 from performing the PUCCH signal transmission using the first beam configuration.

At 425, UE 410 may perform, at a second PUCCH transmission occasion and based at least in part on the determination that the first beam configuration fails to satisfy the threshold, the beamformed transmission of the PUCCH signal according to the second beam configuration. In some aspects, this may include UE 410 identifying a time offset value that is associated with the time difference between the first PUCCH transmission occasion and the second PUCCH transmission occasion. The time offset value may in include a zero value, a positive integer value, an absolute time, and/or relative time. In some aspects, this may include UE 410 identifying a first available PUCCH transmission occasion that occurs after the time offset value following the first PUCCH transmission occasion. Accordingly, the second PUCCH transmission occasion may be based on the first available PUCCH transmission occasion.

Figure 5:
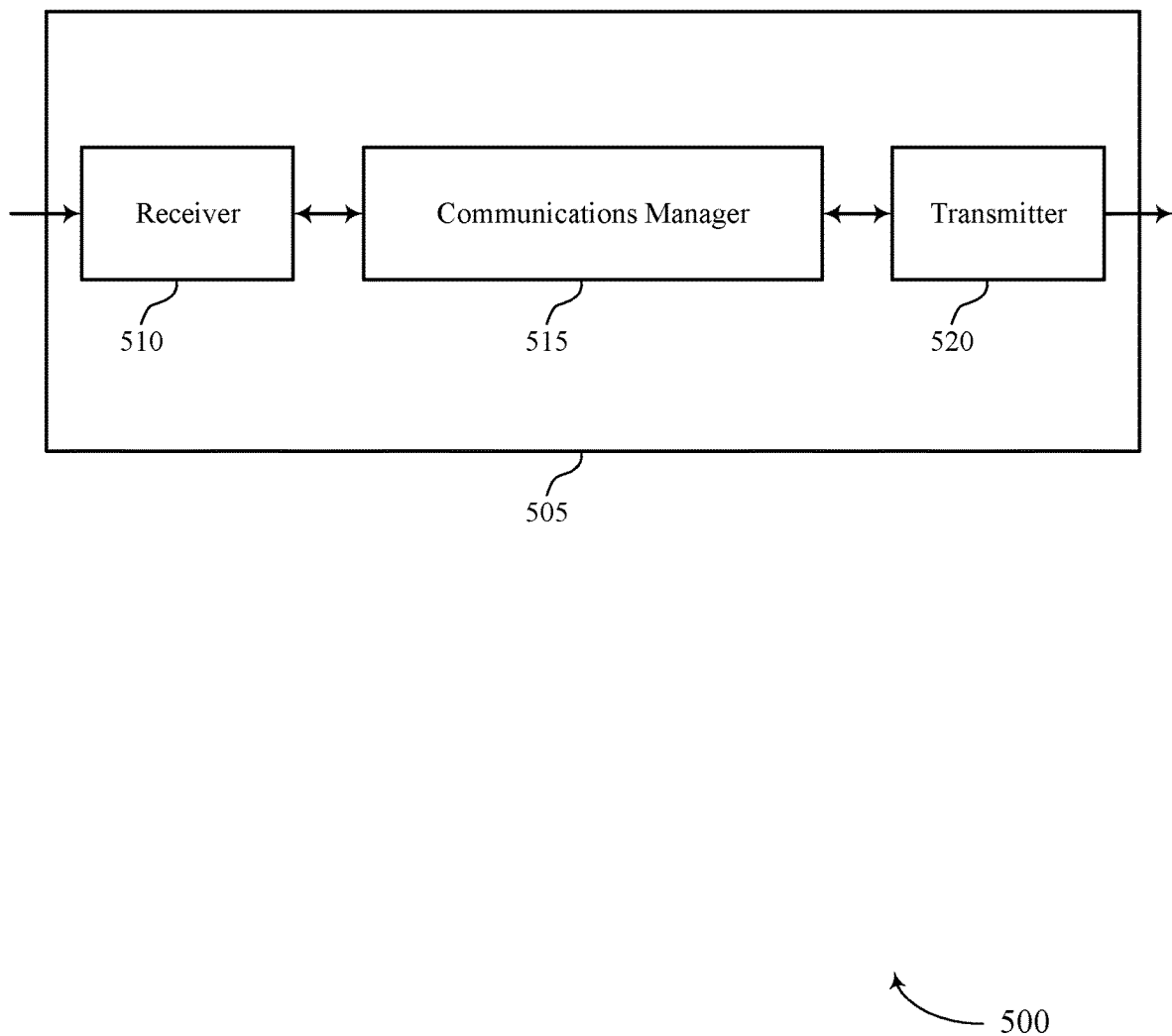
FIGS. 5 and 6 show block diagrams of devices that support PUCCH reliability enhancements in accordance with aspects of the present disclosure.

FIG. 5 shows a block diagram 500 of a device 505 that supports PUCCH reliability enhancements in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to PUCCH reliability enhancements in mmW, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a signal identifying a first beam configuration and a second beam configuration to be used for performing a beamformed transmission of a PUCCH signal, determine, at a first PUCCH transmission occasion associated with the first beam configuration, that a communication metric associated with performing the beamformed transmission of the PUCCH signal using the first beam configuration fails to satisfy a threshold, and perform, at a second PUCCH transmission occasion and based on the determining, the beamformed transmission of the PUCCH signal according to the second beam configuration. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
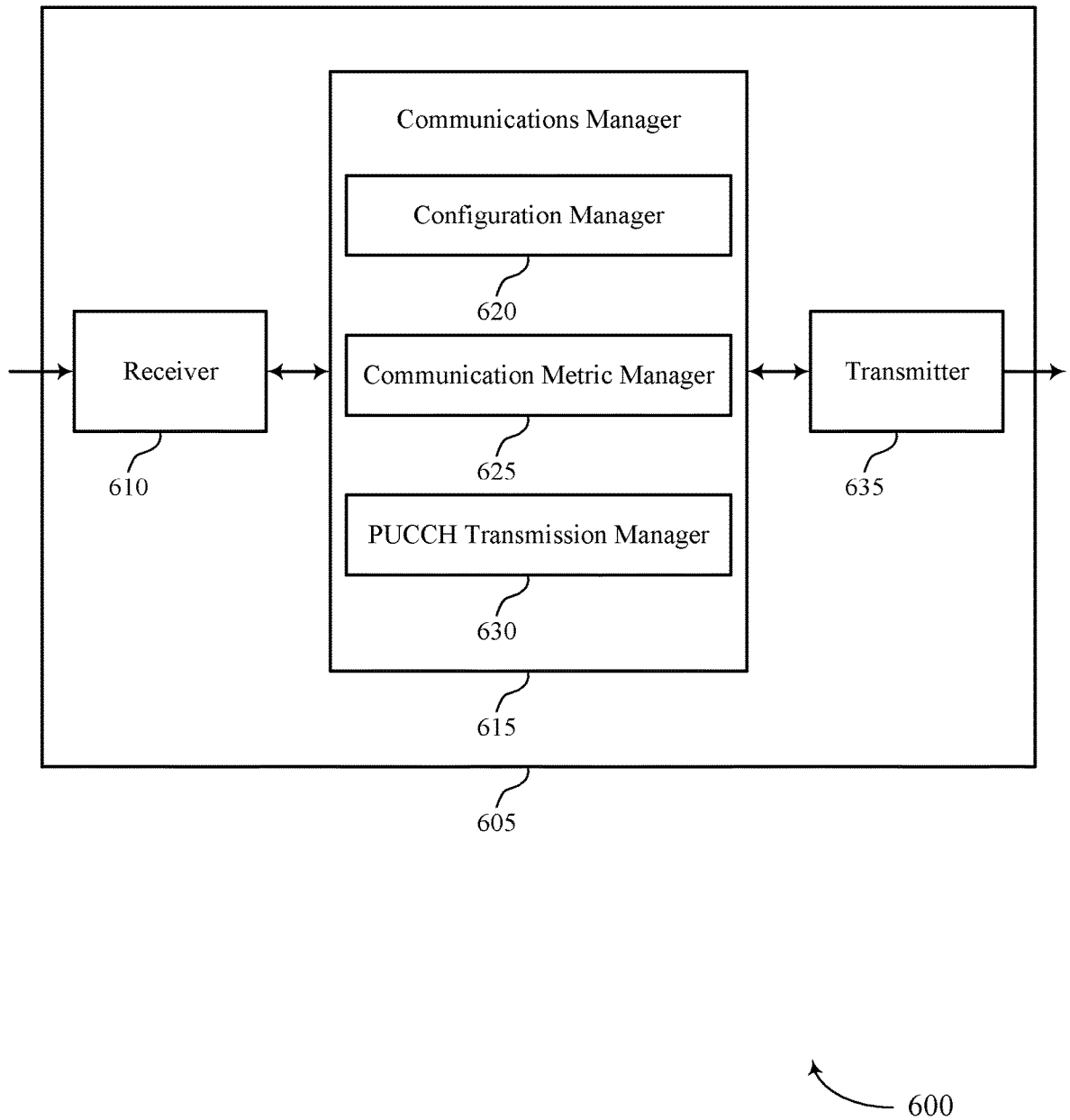

FIG. 6 shows a block diagram 600 of a device 605 that supports PUCCH reliability enhancements in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to PUCCH reliability enhancements in mmW, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a communication metric manager 625, and a PUCCH transmission manager 630. The communications manager 615 may be an example of aspects of the communications manager 810 described herein.

The configuration manager 620 may receive a signal identifying a first beam configuration and a second beam configuration to be used for performing a beamformed transmission of a PUCCH signal.

The communication metric manager 625 may determine, at a first PUCCH transmission occasion associated with the first beam configuration, that a communication metric associated with performing the beamformed transmission of the PUCCH signal using the first beam configuration fails to satisfy a threshold.

The PUCCH transmission manager 630 may perform, at a second PUCCH transmission occasion and based on the determining, the beamformed transmission of the PUCCH signal according to the second beam configuration.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
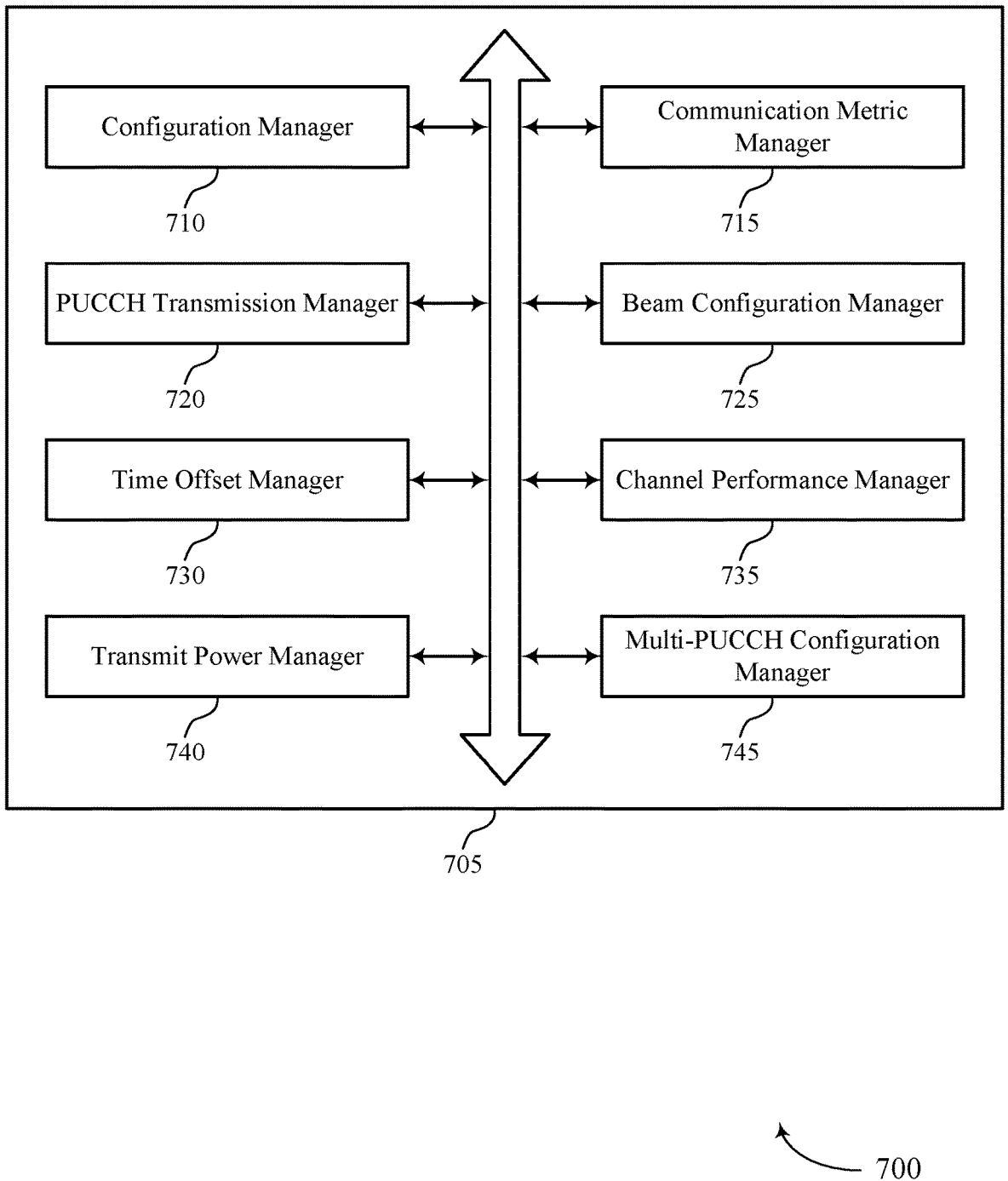
FIG. 7 shows a block diagram of a device that supports PUCCH reliability enhancements in accordance with aspects of the present disclosure.

FIG. 7 shows a block diagram 700 of a communications manager 705 that supports PUCCH reliability enhancements in accordance with aspects of the present disclosure. The communications manager 705 may be an example of aspects of a communications manager 515, a communications manager 615, or a communications manager 810 described herein. The communications manager 705 may include a configuration manager 710, a communication metric manager 715, a PUCCH transmission manager 720, a beam configuration manager 725, a time offset manager 730, a channel performance manager 735, a transmit power manager 740, and a multi-PUCCH configuration manager 745. Each of these modules may communicate, directly or indirectly, with one another (e.g., via one or more buses).

The configuration manager 710 may receive a signal identifying a first beam configuration and a second beam configuration to be used for performing a beamformed transmission of a PUCCH signal. In some cases, the second beam configuration includes a frequency resource that is different from the first beam configuration. In some cases, the first beam configuration includes a first quasi-colocation (QCL) configuration that is different from a second QCL configuration of the second beam configuration. In some cases, the signal is received in at least one of a downlink control indicator (DCI) signal, or a configuration signal, or a combination thereof.

The communication metric manager 715 may determine, at a first PUCCH transmission occasion associated with the first beam configuration, that a communication metric associated with performing the beamformed transmission of the PUCCH signal using the first beam configuration fails to satisfy a threshold.

The PUCCH transmission manager 720 may perform, at a second PUCCH transmission occasion and based on the determining, the beamformed transmission of the PUCCH signal according to the second beam configuration.

The beam configuration manager 725 may determine that the communication metric associated with the second beam configuration satisfies the threshold. In some examples, the beam configuration manager 725 may select the second beam configuration to use to perform the beamformed transmission of the PUCCH signal based on the determining.

The time offset manager 730 may identify, based on the signal, a time-offset value associated with a time difference between the first PUCCH transmission occasion and the second PUCCH transmission occasion. In some examples, the time offset manager 730 may identify a first available PUCCH transmission occasion that occurs after a time-offset value following the first PUCCH transmission occasion, where the second PUCCH transmission occasion is based on the first available PUCCH transmission occasion. In some cases, the time-offset value includes at least one of a zero value, or a positive integer value, or an absolute time, or a relative time.

The channel performance manager 735 may determine that a channel performance parameter associated with using the first beam configuration does not satisfy a threshold value, where the communication metric is based on the channel performance parameter. In some cases, the channel performance parameter includes at least one of a RSRP value, or a RSRQ value, or a SNR, or a SINR, or a throughput rate for the channel, or a combination thereof.

The transmit power manager 740 may determine, based on a MPE limit, that an available transmit power level is below a threshold value, where the communication metric is based on the determining.

The multi-PUCCH configuration manager 745 may receive the signal configuring a set of available PUCCH resources, where the set of available PUCCH resources include at least the first beam configuration and the second beam configuration.

Figure 8:
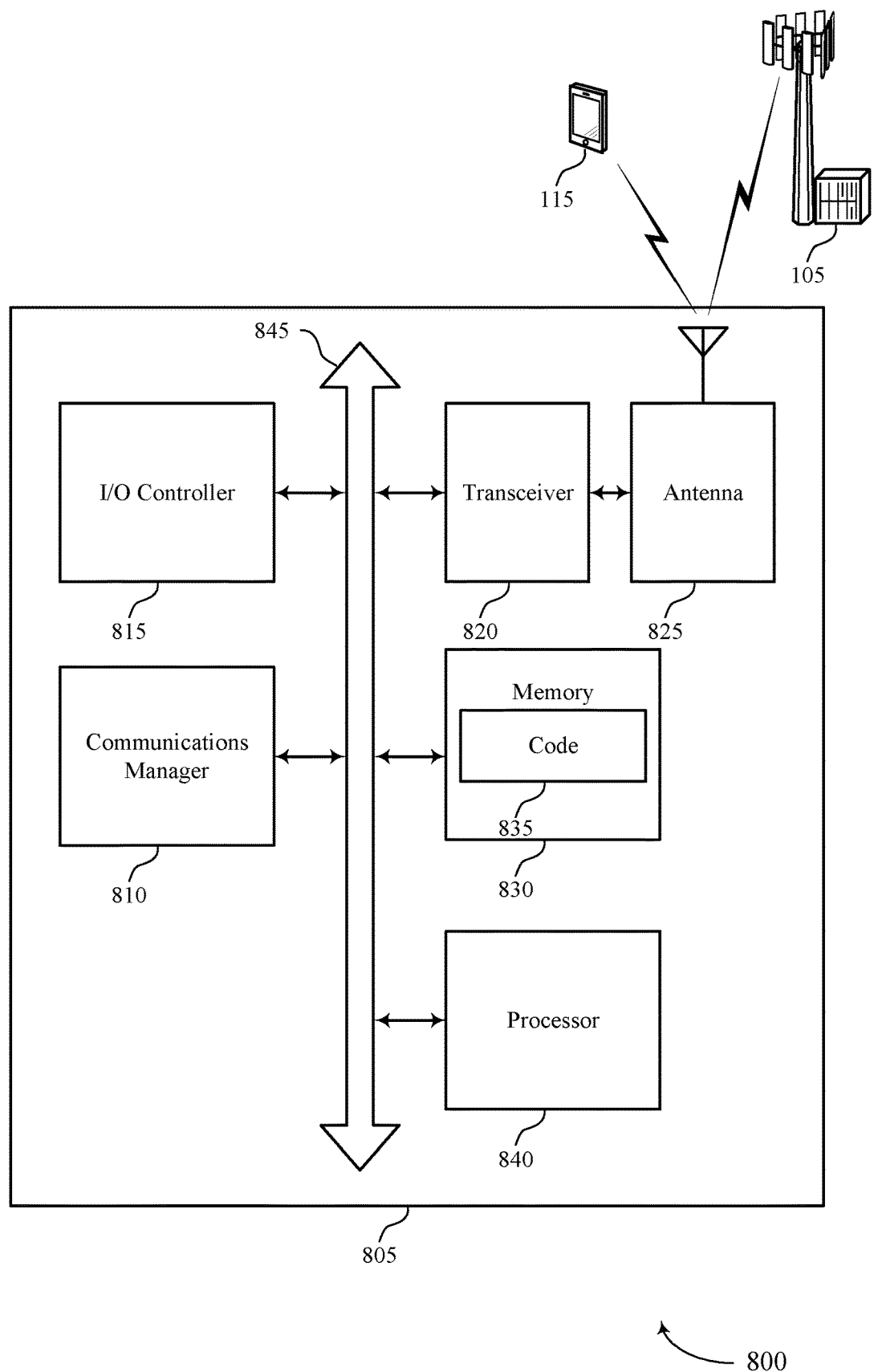
FIG. 8 shows a diagram of a system including a device that supports PUCCH reliability enhancements in accordance with aspects of the present disclosure.

FIG. 8 shows a diagram of a system 800 including a device 805 that supports PUCCH reliability enhancements in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be directly or indirectly coupled with each other, such as via one or more buses (e.g., bus 845).

The communications manager 810 may receive a signal identifying a first beam configuration and a second beam configuration to be used for performing a beamformed transmission of a PUCCH signal, determine, at a first PUCCH transmission occasion associated with the first beam configuration, that a communication metric associated with performing the beamformed transmission of the PUCCH signal using the first beam configuration fails to satisfy a threshold, and perform, at a second PUCCH transmission occasion and based on the determining, the beamformed transmission of the PUCCH signal according to the second beam configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting PUCCH reliability enhancements in mmW).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
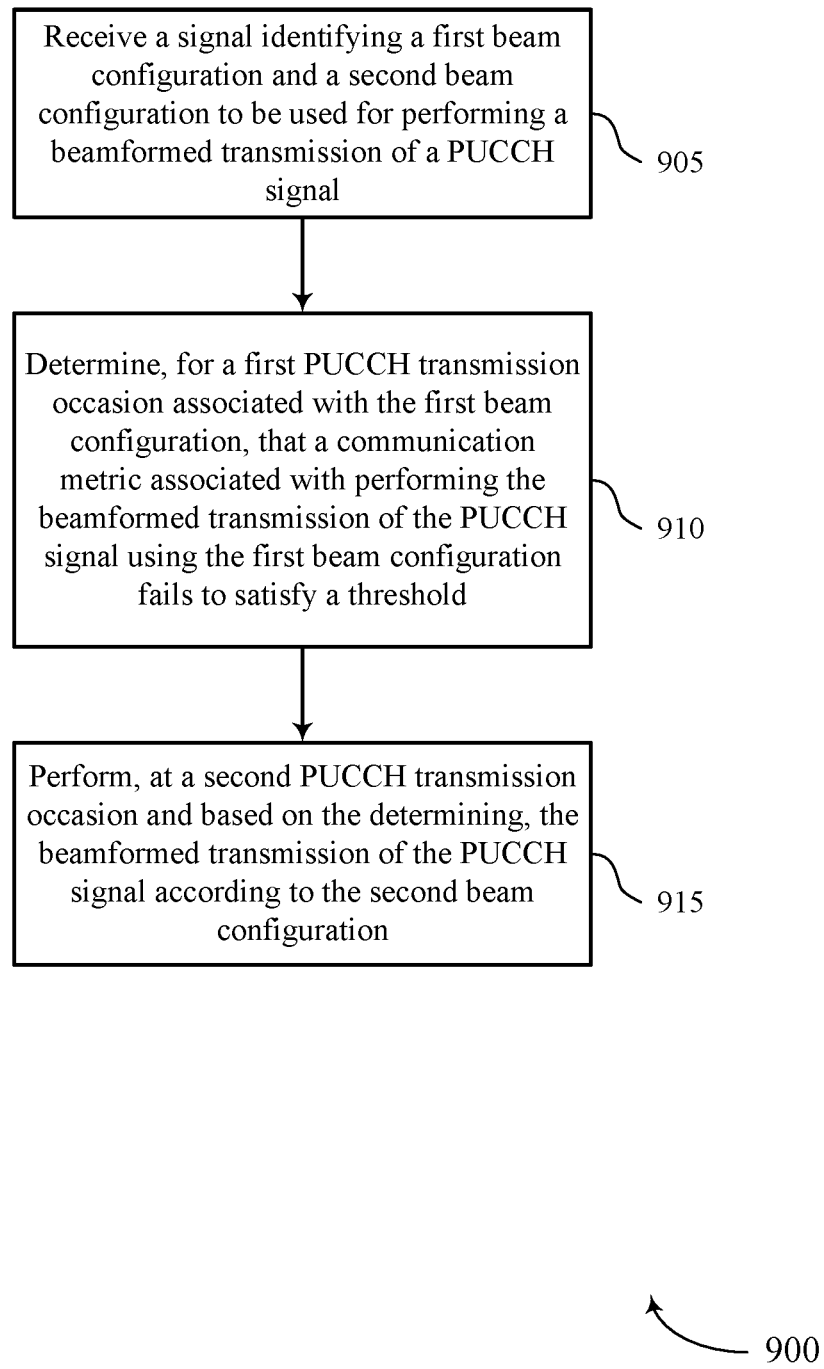
FIGS. 9 through 11 show flowcharts illustrating methods that support PUCCH reliability enhancements in accordance with aspects of the present disclosure.

FIG. 9 shows a flowchart illustrating a method 900 that supports PUCCH reliability enhancements in accordance with aspects of the present disclosure. The operations of method 900 may be implemented by a UE 115 or its components as described herein. For example, the operations of method 900 may be performed by a communications manager as described with reference to FIGS. 5 to 8. In some examples, a UE may execute a set of instructions to control the functional elements of the UE to perform the functions described herein Additionally or alternatively, a UE may perform aspects of the functions described herein using special-purpose hardware.

At 905, the UE may receive a signal identifying a first beam configuration and a second beam configuration to be used for performing a beamformed transmission of a PUCCH signal. The operations of 905 may be performed according to the methods described herein. In some examples, aspects of the operations of 905 may be performed by a configuration manager as described with reference to FIGS. 5 to 8.

At 910, the UE may determine, at a first PUCCH transmission occasion associated with the first beam configuration, that a communication metric associated with performing the beamformed transmission of the PUCCH signal using the first beam configuration fails to satisfy a threshold. The operations of 910 may be performed according to the methods described herein. In some examples, aspects of the operations of 910 may be performed by a communication metric manager as described with reference to FIGS. 5 to 8.

At 915, the UE may perform, at a second PUCCH transmission occasion and based on the determining, the beamformed transmission of the PUCCH signal according to the second beam configuration. The operations of 915 may be performed according to the methods described herein. In some examples, aspects of the operations of 915 may be performed by a PUCCH transmission manager as described with reference to FIGS. 5 to 8.

Figure 10:
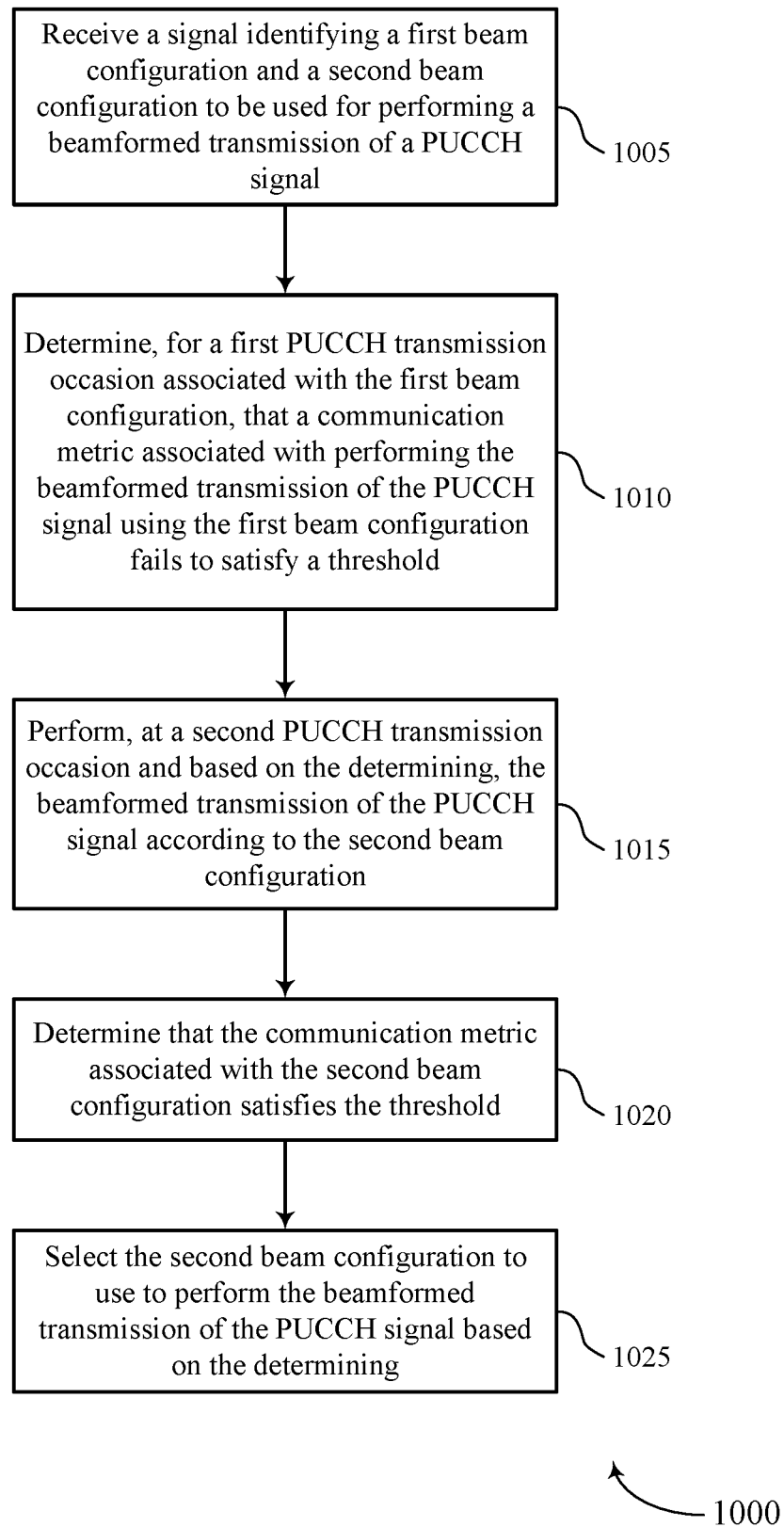

FIG. 10 shows a flowchart illustrating a method 1000 that supports PUCCH reliability enhancements in accordance with aspects of the present disclosure. The operations of method 1000 may be implemented by a UE 115 or its components as described herein. For example, the operations of method 1000 may be performed by a communications manager as described with reference to FIGS. 5 to 8. In some examples, a UE may execute a set of instructions to control the functional elements of the UE to perform the functions described herein. Additionally or alternatively, a UE may perform aspects of the functions described herein using special-purpose hardware.

At 1005, the UE may receive a signal identifying a first beam configuration and a second beam configuration to be used for performing a beamformed transmission of a PUCCH signal. The operations of 1005 may be performed according to the methods described herein. In some examples, aspects of the operations of 1005 may be performed by a configuration manager as described with reference to FIGS. 5 to 8.

At 1010, the UE may determine, at a first PUCCH transmission occasion associated with the first beam configuration, that a communication metric associated with performing the beamformed transmission of the PUCCH signal using the first beam configuration fails to satisfy a threshold. The operations of 1010 may be performed according to the methods described herein. In some examples, aspects of the operations of 1010 may be performed by a communication metric manager as described with reference to FIGS. 5 to 8.

At 1015, the UE may perform, at a second PUCCH transmission occasion and based on the determining, the beamformed transmission of the PUCCH signal according to the second beam configuration. The operations of 1015 may be performed according to the methods described herein. In some examples, aspects of the operations of 1015 may be performed by a PUCCH transmission manager as described with reference to FIGS. 5 to 8.

At 1020, the UE may determine that the communication metric associated with the second beam configuration satisfies the threshold. The operations of 1020 may be performed according to the methods described herein. In some examples, aspects of the operations of 1020 may be performed by a beam configuration manager as described with reference to FIGS. 5 to 8.

At 1025, the UE may select the second beam configuration to use to perform the beamformed transmission of the PUCCH signal based on the determining at 1020. The operations of 1025 may be performed according to the methods described herein. In some examples, aspects of the operations of 1025 may be performed by a beam configuration manager as described with reference to FIGS. 5 to 8.

Figure 11:
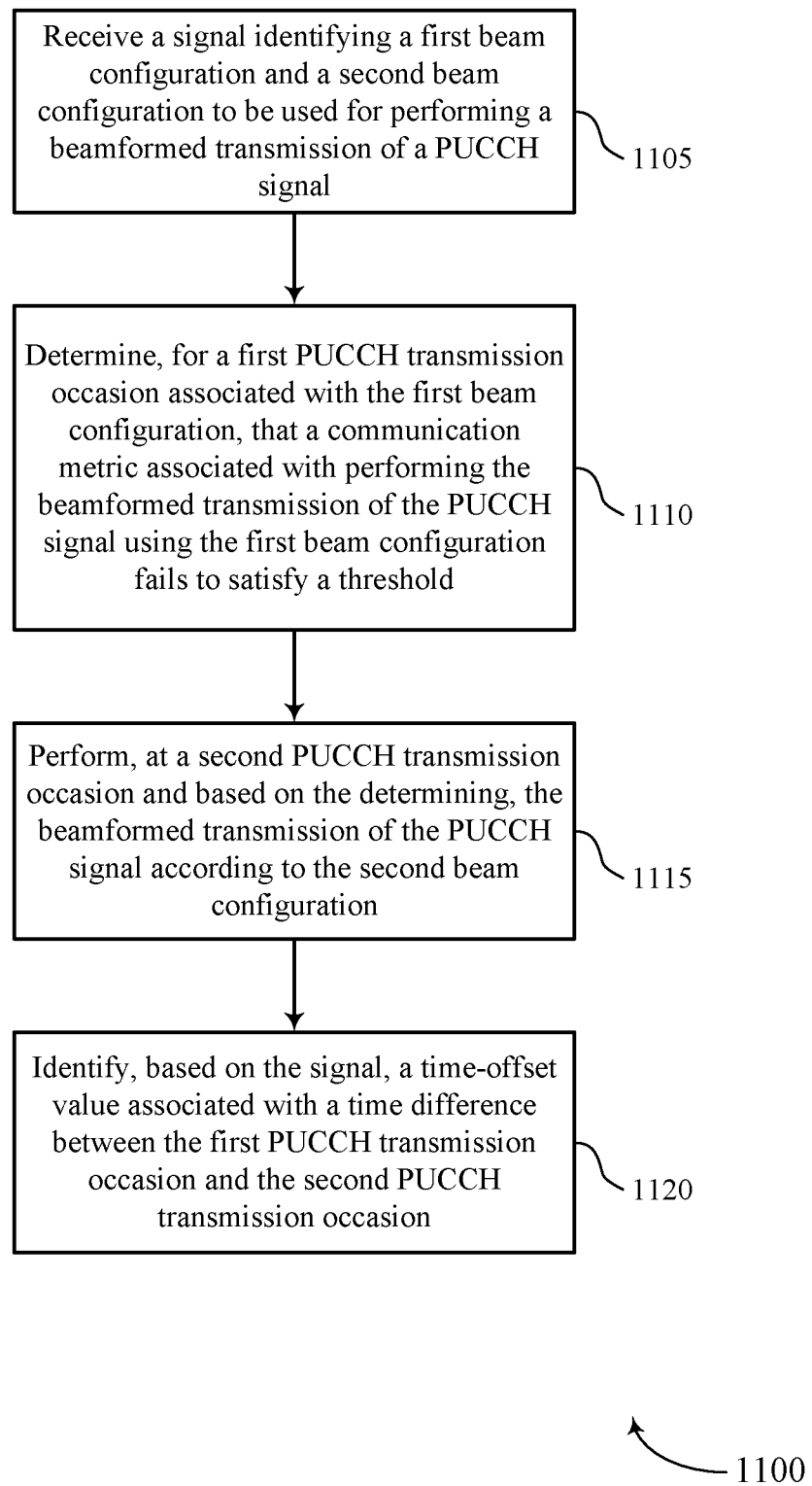

FIG. 11 shows a flowchart illustrating a method 1100 that supports PUCCH reliability enhancements in accordance with aspects of the present disclosure. The operations of method 1100 may be implemented by a UE 115 or its components as described herein. For example, the operations of method 1100 may be performed by a communications manager as described with reference to FIGS. 5 to 8. In some examples, a UE may execute a set of instructions to control the functional elements of the UE to perform the functions described herein. Additionally or alternatively, a UE may perform aspects of the functions described herein using special-purpose hardware.

At 1105, the UE may receive a signal identifying a first beam configuration and a second beam configuration to be used for performing a beamformed transmission of a PUCCH signal. The operations of 1105 may be performed according to the methods described herein. In some examples, aspects of the operations of 1105 may be performed by a configuration manager as described with reference to FIGS. 5 to 8.

At 1110, the UE may determine, at a first PUCCH transmission occasion associated with the first beam configuration, that a communication metric associated with performing the beamformed transmission of the PUCCH signal using the first beam configuration fails to satisfy a threshold. The operations of 1110 may be performed according to the methods described herein. In some examples, aspects of the operations of 1110 may be performed by a communication metric manager as described with reference to FIGS. 5 to 8.

At 1115, the UE may perform, at a second PUCCH transmission occasion and based on the determining, the beamformed transmission of the PUCCH signal according to the second beam configuration. The operations of 1115 may be performed according to the methods described herein. In some examples, aspects of the operations of 1115 may be performed by a PUCCH transmission manager as described with reference to FIGS. 5 to 8.

At 1120, the UE may identify, based on the signal, a time-offset value associated with a time difference between the first PUCCH transmission occasion and the second PUCCH transmission occasion. The operations of 1120 may be performed according to the methods described herein. In some examples, aspects of the operations of 1120 may be performed by a time offset manager as described with reference to FIGS. 5 to 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a signal identifying a first beam configuration and a second beam configuration to be used for performing a beamformed transmission of a physical uplink control channel (PUCCH) signal;
   determining, for a first PUCCH transmission occasion associated with the first beam configuration, that a communication metric associated with performing the beamformed transmission of the PUCCH signal using the first beam configuration fails to satisfy a threshold; and
   performing, at a second PUCCH transmission occasion and based at least in part on the determining, the beamformed transmission of the PUCCH signal according to the second beam configuration.

2. The method of claim 1, further comprising:
   determining that the communication metric associated with the second beam configuration satisfies the threshold; and
   selecting the second beam configuration to use to perform the beamformed transmission of the PUCCH signal based at least in part on determining that the communication metric associated with the second beam configuration satisfies the threshold.

3. The method of claim 1, further comprising:
   identifying, based at least in part on the signal, a time-offset value associated with a time difference between the first PUCCH transmission occasion and the second PUCCH transmission occasion.

4. The method of claim 3, wherein the time-offset value comprises at least one of a zero value, or a positive integer value, or an absolute time, or a relative time.

5. The method of claim 1, further comprising:
   identifying a first available PUCCH transmission occasion that occurs after a time-offset value following the first PUCCH transmission occasion, wherein the second PUCCH transmission occasion is based at least in part on the first available PUCCH transmission occasion.

6. The method of claim 1, wherein determining, for the first PUCCH transmission occasion associated with the first beam configuration, that the communication metric associated with performing the beamformed transmission of the PUCCH signal using the first beam configuration fails to satisfy the threshold, comprises:
   determining that a value for a channel performance parameter associated with using the first beam configuration does not satisfy the threshold, wherein the communication metric is based at least in part on the channel performance parameter.

7. The method of claim 6, wherein the value for the channel performance parameter comprises at least one of a reference signal receive power (RSRP) value, or a reference signal receive quality (RSRQ) value, or a signal-to-noise ratio (SNR), or a signal-to-noise-plus-interference (SINK), or a throughput rate for a channel, or a combination thereof.

8. The method of claim 1, wherein determining, for the first PUCCH transmission occasion associated with the first beam configuration, that the communication metric associated with performing the beamformed transmission of the PUCCH signal using the first beam configuration fails to satisfy the threshold, comprises:
   determining, based at least in part on a maximum permissible exposure (MPE) limit, that an available transmit power level is below a value associated with the threshold, wherein the communication metric is based at least in part on determining that the available transmit power level is below the value.

9. The method of claim 1, further comprising:
   receiving the signal configuring a plurality of available PUCCH resources, wherein the plurality of available PUCCH resources comprise at least the first beam configuration and the second beam configuration.

10. The method of claim 1, wherein the second beam configuration comprises a frequency resource that is different from a frequency resource of the first beam configuration.

11. The method of claim 1, wherein the first beam configuration comprises a first quasi-colocation (QCL) configuration that is different from a second QCL configuration of the second beam configuration.

12. The method of claim 1, wherein the signal is received in at least one of a downlink control indicator (DCI) signal, or a configuration signal, or a combination thereof.

13. An apparatus for wireless communication at a user equipment (UE), comprising:
   a processor,
   memory coupled with the processor; and
   instructions stored in the memory and executable by the processor to cause the apparatus to:
      receive a signal identifying a first beam configuration and a second beam configuration to be used for performing a beamformed transmission of a physical uplink control channel (PUCCH) signal;
      determine, for a first PUCCH transmission occasion associated with the first beam configuration, that a communication metric associated with performing the beamformed transmission of the PUCCH signal using the first beam configuration fails to satisfy a threshold; and
      perform, at a second PUCCH transmission occasion and based at least in part on the determining, the beamformed transmission of the PUCCH signal according to the second beam configuration.

14. The apparatus of claim 13, wherein the instructions are further executable by the processor to cause the apparatus to:
   determine that the communication metric associated with the second beam configuration satisfies the threshold; and
   select the second beam configuration to use to perform the beamformed transmission of the PUCCH signal based at least in part on determining that the communication metric associated with the second beam configuration satisfies the threshold.

15. The apparatus of claim 13, wherein the instructions are further executable by the processor to cause the apparatus to:

identify, based at least in part on the signal, a time-offset value associated with a time difference between the first PUCCH transmission occasion and the second PUCCH transmission occasion.

16. The apparatus of claim 15, wherein the time-offset value comprises at least one of a zero value, or a positive integer value, or an absolute time, or a relative time.

17. The apparatus of claim 13, wherein the instructions are further executable by the processor to cause the apparatus to:
identify a first available PUCCH transmission occasion that occurs after a time-offset value following the first PUCCH transmission occasion, wherein the second PUCCH transmission occasion is based at least in part on the first available PUCCH transmission occasion.

18. The apparatus of claim 13, wherein the instructions executable by the processor to determine, for the first PUCCH transmission occasion associated with the first beam configuration, that the communication metric associated with performing the beamformed transmission of the PUCCH signal using the first beam configuration fails to satisfy the threshold, cause the apparatus to:
determine that a value for a channel performance parameter associated with using the first beam configuration does not satisfy the threshold, wherein the communication metric is based at least in part on the channel performance parameter.

19. The apparatus of claim 18, wherein the value for the channel performance parameter comprises at least one of a reference signal receive power (RSRP) value, or a reference signal receive quality (RSRQ) value, or a signal-to-noise ratio (SNR), or a signal-to-noise-plus-interference (SINK), or a throughput rate for a channel, or a combination thereof.

20. The apparatus of claim 13, wherein the instructions executable by the processor to determine, for the first PUCCH transmission occasion associated with the first beam configuration, that the communication metric associated with performing the beamformed transmission of the PUCCH signal using the first beam configuration fails to satisfy the threshold, cause the apparatus to:
determine, based at least in part on a maximum permissible exposure (MPE) limit, that an available transmit power level is below a value associated with the threshold, wherein the communication metric is based at least in part on determining that the available transmit power level is below the threshold value.

21. The apparatus of claim 13, wherein the instructions are further executable by the processor to cause the apparatus to:
receive the signal configuring a plurality of available PUCCH resources, wherein the plurality of available PUCCH resources comprise at least the first beam configuration and the second beam configuration.

22. The apparatus of claim 13, wherein the second beam configuration comprises a frequency resource that is different from a frequency resource of the first beam configuration.

23. The apparatus of claim 13, wherein the first beam configuration comprises a first quasi-colocation (QCL) configuration that is different from a second QCL configuration of the second beam configuration.

24. The apparatus of claim 13, wherein the signal is received in at least one of a downlink control indicator (DCI) signal, or a configuration signal, or a combination thereof.

25. A method for wireless communication at a user equipment (UE), comprising:
receiving a signal identifying a first beam configuration and a second beam configuration to be used for performing a beamformed transmission of a physical uplink control channel (PUCCH);
selecting the first beam configuration as a primary configuration to be used for performing the beamformed transmission; and
performing the beamformed transmission of the PUCCH signal using the second beam configuration based at least on part on determining that a communication metric associated with the first beam configuration fails to satisfy a threshold.

26. The method of claim 25, further comprising:
determining, for a first PUCCH transmission occasion associated with the first beam configuration, that the communication metric associated with performing the beamformed transmission of the PUCCH signal fails to satisfy the threshold;
selecting the second beam configuration to use to perform the beamformed transmission of the PUCCH signal based at least in part on determining that the communication metric associated with the second beam configuration satisfies the threshold; and
performing the beamformed transmission of the PUCCH signal using the second beam configuration at a second PUCCH transmission occasion.

27. The method of claim 26, further comprising:
identifying a first available PUCCH transmission occasion that occurs after a time-offset value following the first PUCCH transmission occasion, wherein the second PUCCH transmission occasion is based at least in part on the first available PUCCH transmission occasion.

28. An apparatus for wireless communications at a user equipment (UE), comprising:
a processor;
memory coupled with the processor; and
instructions stored in the memory and executable by the processor to cause the apparatus to:
receive a signal identifying a first beam configuration and a second beam configuration to be used for performing a beamformed transmission of a physical uplink control channel (PUCCH);
select the first beam configuration as a primary configuration to be used for performing the beamformed transmission; and
perform the beamformed transmission of the PUCCH signal using the second beam configuration based at least on part on determining that a communication metric associated with the first beam configuration fails to satisfy a threshold.

29. The apparatus of claim 28, wherein the instructions are further executable by the processor to cause the apparatus to:
determine, for a first PUCCH transmission occasion associated with the first beam configuration, that the communication metric associated with performing the beamformed transmission of the PUCCH signal fails to satisfy the threshold;
select the second beam configuration to use to perform the beamformed transmission of the PUCCH signal based at least in part on determining that the communication metric associated with the second beam configuration satisfies the threshold; and
perform the beamformed transmission of the PUCCH signal using the second beam configuration at a second PUCCH transmission occasion.

30. The apparatus of claim 29, wherein the instructions are further executable by the processor to cause the apparatus to:
 identify a first available PUCCH transmission occasion that occurs after a time-offset value following the first PUCCH transmission occasion, wherein the second PUCCH transmission occasion is based at least in part on the first available PUCCH transmission occasion.

* * * * *